US006390692B1

United States Patent
Booth

(10) Patent No.: US 6,390,692 B1
(45) Date of Patent: May 21, 2002

(54) MIRROR SYSTEM HAVING REDUCED VIBRATION FOR A SINGLE-LENS-REFLEX CAMERA

(76) Inventor: William L. Booth, Sinaloa #25, 23060 La Paz, BCS (MX)

(*) Notice: Subject to any disclaimer, the term of this patent is extended or adjusted under 35 U.S.C. 154(b) by 0 days.

(21) Appl. No.: 09/884,832

(22) Filed: Jun. 19, 2001

(51) Int. Cl.$^7$ .......................... G03B 19/12; G03B 17/00
(52) U.S. Cl. ..................... 396/358; 396/447; 396/354; 396/356
(58) Field of Search ................. 396/354, 356, 396/358, 447

(56) References Cited

U.S. PATENT DOCUMENTS

| | | | |
|---|---|---|---|
| 3,757,661 A | 9/1973 | Ochiai et al. | 396/356 |
| 3,785,270 A | 1/1974 | Schiff et al. | 396/358 |
| 3,911,454 A | 10/1975 | Ohmori | 396/355 |
| 3,967,290 A | 6/1976 | Waaske | 396/355 |
| 4,659,202 A | 4/1987 | Sadre-Marandi et al. | 396/358 |
| 4,750,012 A | 6/1988 | Lindenfelser | 396/355 |
| 4,758,853 A | 7/1988 | Celenze | 396/358 |
| 5,715,003 A | * 2/1998 | Kanno | 348/341 |

* cited by examiner

Primary Examiner—David M. Gray
Assistant Examiner—Rochelle Blackman
(74) Attorney, Agent, or Firm—David Pressman

(57) ABSTRACT

A single-lens-reflex camera includes means for virtually eliminating vibration, noise, and motion caused by mirror movement, resulting in a higher resolution image being recorded on a light-sensitive surface at the rear of the camera. A pair of bi-parting mirrors are smoothly and noiselessly slid from a position adjacent each other, reflecting an image upward to a viewing screen for focusing and viewing, to a separated position. When mirrors are separated they are clear of the image, so the image can then fall upon the shutter and light-sensitive surface at the rear of the camera. After the image is recorded on the light-sensitive surface, the mirrors return to their original adjacent position. The mirrors are symmetrically arranged, so their inertial masses oppose and cancel each other during mirror movement, thereby eliminating camera movement from this source. This allows larger and heavier mirrors to be used in large format cameras. Space does not have to be allowed for the arc of a pivoted mirror to clear the objective lens, so the camera body can be reduced in size, and a larger mirror can be used. The mechanism for the mirror moving means is simple and rugged. Most usual camera features can be incorporated into a camera utilizing this system. The quietness of this mirror moving means makes its use advantageous for cameras used in wildlife and candid photography.

17 Claims, 4 Drawing Sheets

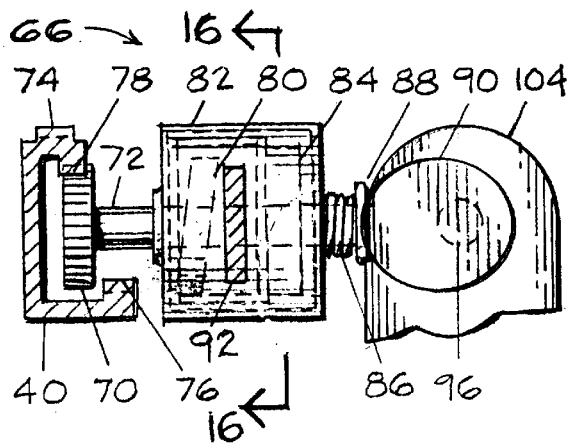
FIG. 11
FIG. 12
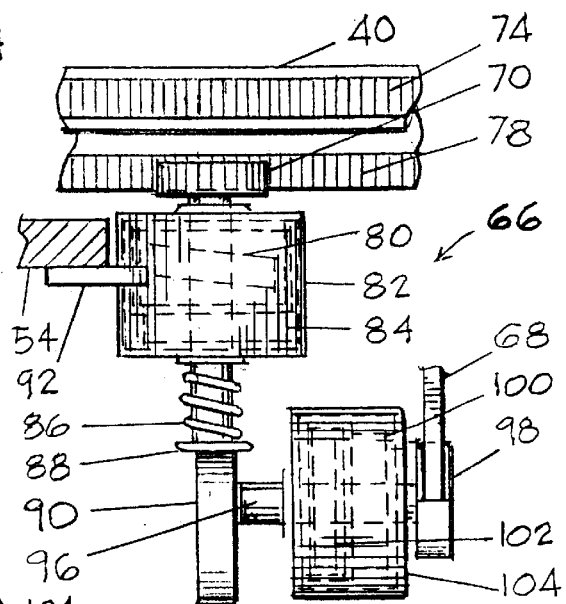
FIG. 14
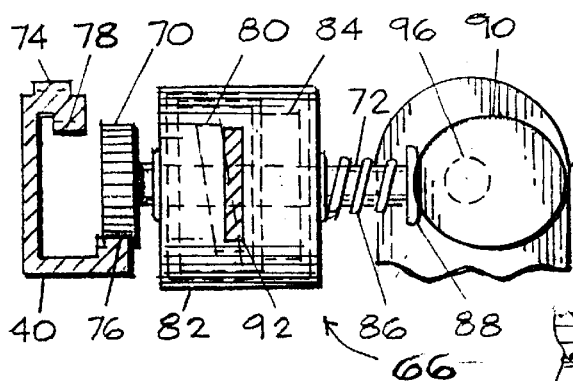
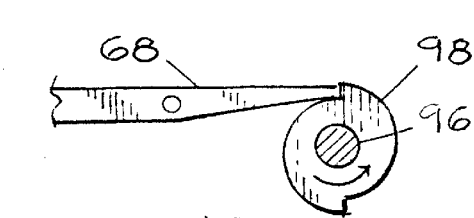
FIG. 13
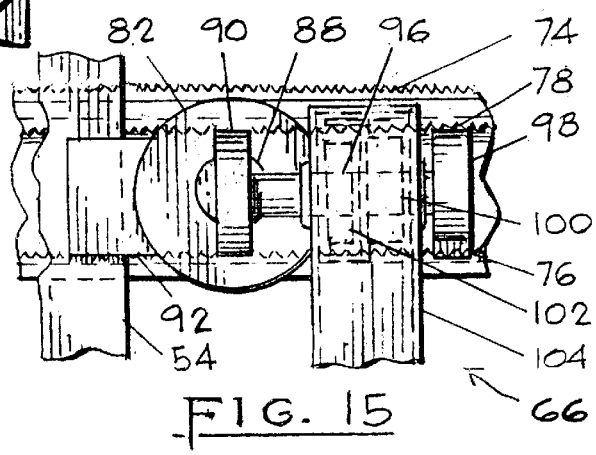
FIG. 15
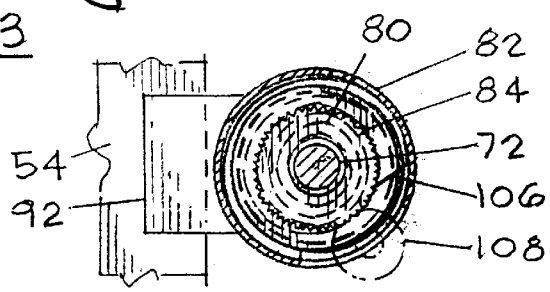
FIG. 16

MIRROR SYSTEM HAVING REDUCED VIBRATION FOR A SINGLE-LENS-REFLEX CAMERA

FEDERALLY SPONSORED RESEARCH

None

SEQUENCE LISTING OR PROGRAM

None

BACKGROUND

1. Field of Invention

This invention relates to a camera, specifically to a mirror apparatus for the viewfinder of a single-lens-reflex camera.

2. Description of Prior Art

Typical single-lens-reflex (SLR) cameras have an optical system comprised of an objective lens, a pivoted movable mirror to reflect an inverted image upward to a viewing screen, and optics (a pentaprism) to erect the inverted image and direct it to an eyepiece. The user can then compose and focus the image on the viewing screen. The typical SLR camera also includes hardware to pivot the mirror out of the path of the image so the image can pass through the camera to a focal plane shutter and fall upon a light-sensitive surface at the back of the camera, and thereafter to reposition the mirror back to its original position for subsequent camera operations. The advantages of this system, compared to a rangefinder type camera, are that parallax misalignment is eliminated, and focusing and composing are easier.

However, the SLR camera system has serious disadvantages:

a) The hardware to pivot or otherwise move the mirror is complex and space-consuming. The mirror must be pivoted so its moving arc clears the objective lens, which means the mirror must be smaller, or the camera larger than would ideally be the case b) The rapid and abrupt manner in which the mirror must pivot up and then down causes shock and vibration as the mirror impacts its hardware. This vibration makes it difficult to get a high resolution image on the film.

c) The noise generated by the mirror impacting its hardware makes wildlife and certain other types of photography difficult.

Some solutions of these problems have been proposed by the following: Ochai and Kato (U.S. Pat. No. 3,757,661, granted Sep. 11, 1973), Ohmori (U.S. Pat. No. 3,911,454, granted Oct. 7, 1975), and Kanno (U.S. Pat. No. 5,715,003, granted Feb. 3, 1998), have devised a mechanism for sliding the mirror horizontally out of the picture frame. Waaske (U.S. Pat. No. 3,967,290, granted Jun. 29, 1976), Schiff and Rikis (U.S. Pat. No. 3,785,270, granted Jan. 15, 1974), Sadre-Marandi et al. (U.S. Pat. No. 4,659,202, granted Apr. 21, 1987), and Lindenfelser (U.S. Pat. No. 4,750,012, granted Jun. 7, 1988), have devised a mechanism for sliding the mirror vertically out of the picture frame. Celenze (U.S. Pat. No. 4,758,853, granted Jul. 19, 1988) has a combination flexible mirror/shutter, which reflects the image to a viewfinder, then displaces to present a slot through which the image reachs the film. Although these mechanisms solve some of the problems mentioned above, none solve the problems of vibration and noise, and they are generally complicated, bulky and space consuming.

Also, a camera using a fixed, half-silvered pellicular mirror has been sold by Canon under the trademark Pelix. This camera solves the vibration problem, but at the expense of a compromised image brightness on the viewfinder screen and on the film surface.

OBJECTS AND ADVANTAGES

Accordingly, one object of this invention is to overcome the shortcomings and disadvantages of the typical single-lens-reflex camera by:

a) virtually elilnating vibration and noise in the mirror moving mechanism of an SLR camera, making higher resolution images possible, b) providing an SLR camera with a simple mirror moving apparatus which is very rigid and rugged, with few moving parts, which will keep the mirrors in alignment under the most severe conditions, assuring increased reliability and trouble-free service, and c) providing an SLR camera in which the mirror is close to the rear of the objective lens, allowing a larger mirror, and a brighter image on the viewing screen, as well as a smaller and more compact camera.

Other advantages will become apparent from reading the following sections and perusing the accompanying drawings.

SUMMARY

A simple and rugged mirror system for an SLR camera virtually eliminates camera movement, noise, and vibration caused by mirror action. It utilizes a pair of dynamically balanced bi-parting sliding mirrors, which, in a contiguous (normal) position reflect an undistorted image to the viewing screen, and which slide apart to allow the image then to pass through an aperture to the rear of the camera to record the image. Thereafter they return to their contiguous position.

DRAWINGS

FIG. 11 is an enlarged cross section of the mirror operating bar and its drive system taken on line 11 of FIG. 4 (moving the bar to the right).

FIG. 12 is an enlarged cross section of the bar and its drive system taken on line 12 of FIG. 6 (moving the bar to the left).

FIG. 13 is an elevation of a pawl and escapement wheel used to position a cam in the drive system which controls the lateral movement of the bar.

FIG. 14 is an enlarged plan view of a drive system for the bar.

FIG. 15 is an enlarged elevation of the drive system.

FIG. 16 is a section taken along line 16—16 of FIG. 11, showing a spring, a spring winding gear, and a spring housing of the mirror moving mechanism.

Figure 1:
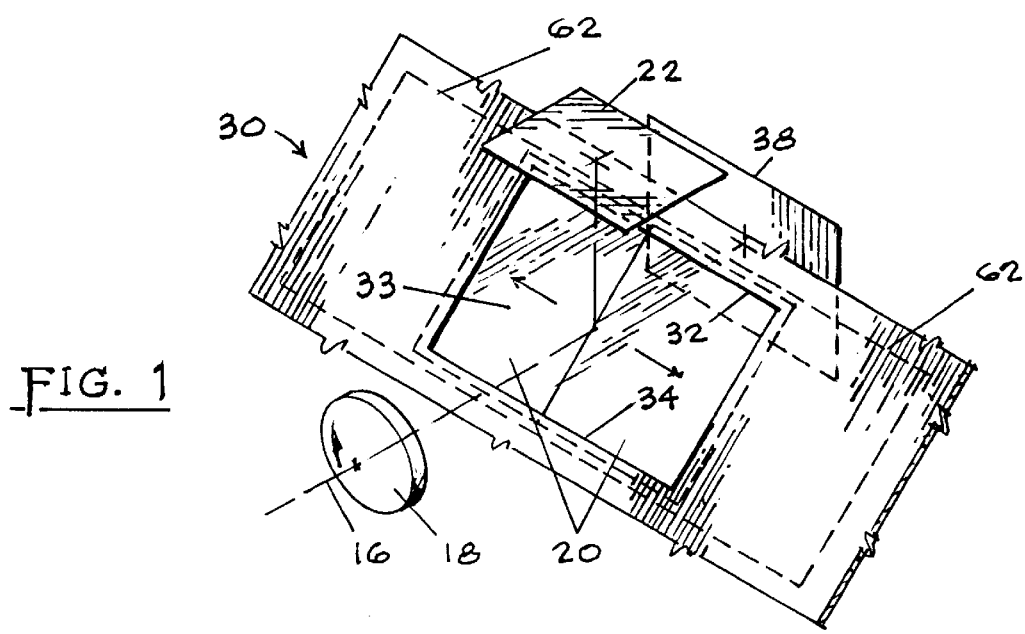
FIG. 1 is a simplified isometric view of the optical components of an SLR camera according to my invention, illustrating its basic operation.

REFERENCE NUMERALS 14 camera body
16 image path
18 lens
19 diaphragm
20 mirrors
22 viewfinder screen
24 field lens
26 pentaprism
28 eyepiece
30 mirror moving app.
32 mirror upper guide
33 aperture
34 mirror lower guide
36 shutter
38 film
40 bar
42 gear
44 flanged support wheel
46 geared boss
48 wheel
50 connecting rod
52 mirror flange
54 pylon
56 eyepiece cap
58 sliding strip
60 resilient spacer
62 mirror housing
64 light seal
66 bar 40 drive system
68 pawl
70 pinion gear
72 shaft
74 bar 40 rack for g'r 42
76 lower rack for gear 70
78 upper rack for gear 70
80 driving spring
82 spring housing and bearing
84 winding gear
86 compresson spring
88 spring retainer cap
90 cam
92 attachment bracket
94 shutter lever
96 camshaft
98 escapement wheel
100 winding gear
104 spring housing and bearing
106 wind'g gear pawl
108 camera gear train

DETAILED DESCRIPTION

Description—FIG. 1.

Figure 2:
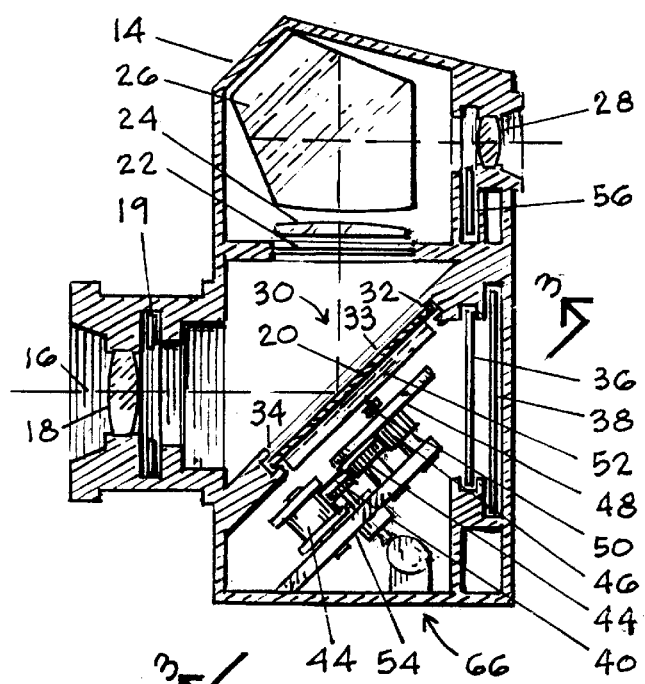
FIG. 2 is a vertical section through the SLR camera.

FIG. 1 is a simplified isometric view showing the main optical components and their relationship in my SLR camera. The components are a lens 18, a viewing screen 22, an aperture 33, and a film strip 38. Also indicated is a mirror moving apparatus 30, which comprises two mirror housings 62 and coplanar left and right mirrors 20 mounted within upper and lower guides 32 and 34 in a position to reflect an image from lens 18 to the viewing screen. The components parts of apparatus 30 are shown in FIG. 2, and are described below.

Operation—FIG. 1.

Prior to picture taking, mirrors 20, in closed position (as shown), reflect an image from lens 18 to viewing screen 22. After the shutter button (not shown) is depressed, the mirrors slide apart and into housings 62, (as shown by the arrows), allowing the image to pass through aperture 33 and to be recorded upon film 38. The mirrors then return to their closed position. Since the mirrors are balanced, and their motions are opposed to each other, and since there is no abrupt impacting of any hardware, the mirror moving sequence is quiet and vibration-free.

Description of mirror moving apparatus 30—FIGS. 2–16.

FIG. 2 is a cross section through the camera showing apparatus 30, which is rigidly fixed within a camera body 14, and other usual elements of an SLR camera, such as a viewing screen, a pentaprism, a shutter, an eyepiece, etc.

Figure 2A:
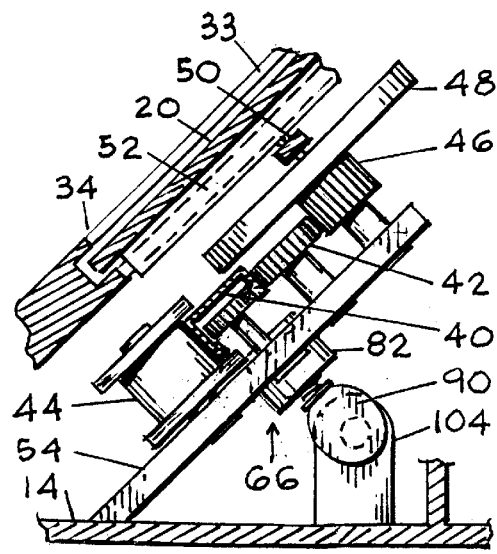
FIG. 2a is an enlarged detail through the mirror moving apparatus of FIG. 2, taken along the line 2a—2a of FIG. 7.
Figure 7:
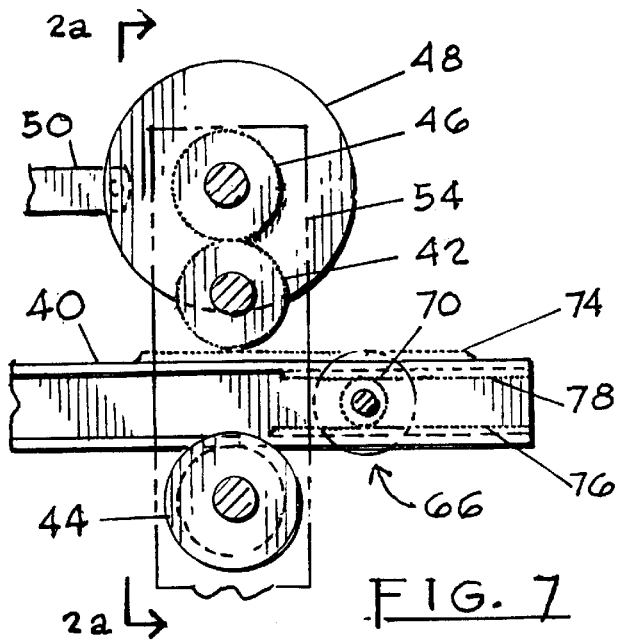
FIG. 7 is an enlarged elevational view of principal mirror moving components, with the supporting pylon indicated by ghost lines.

Apparatus 30, the essence of the mirror system, comprises a bar 40, gears 42, support wheels 44, wheels 48 with bosses 46, connecting rods 50, mirrors 20, aperture 33, housings 62, pylons 54 and a drive system 66. FIG. 2a shows the apparatus in greater detail, and FIGS. 3–6 show the relationships of the parts more clearly. The parts will now be described in detail:

Bar 40 (FIGS. 11–12) is in the general shape of a channel with unequal legs. Rack gears 74 are situated on the upper face of its shorter upper leg, in positions to mesh with gears 42 at either end (FIG. 7). The lower face of its upper leg contains an upper rack 78, and the upper face of its lower leg contains a lower rack 76, situated to mesh alternately with a pinion gear 70 of drive system 66, which drives the bar laterally, and will be described later.

Gears 42 (FIG. 7) are situated between bar 40 and the geared bosses 46 on wheels 48, and are meshed with each. They translate the lateral motion of bar 40 to a rotary motion of the wheels.

Support wheels 44 (FIG. 7) are situated below bar 40 to keep bar 40 meshed with gears 42 and drive system 66. Flanges on the wheel rims keep bar 40 aligned.

Wheels 48 (FIG. 7) are provided with geared bosses 46, which engage gears 42. As mentioned above, gears 42 also engage racks 74 on bar 40 (FIGS. 3, 6, and 7) to translate a lateral motion of the bar to a rotary motion of bosses 46 and wheels 48. The wheels are sized so that the connecting rods 50, in a first position (FIGS. 3–4), extend to hold mirrors 20 in a closed position, and in a second position (FIGS. 5–6), after the wheels have rotated 180°, the rods separate the mirrors and move them into housings 62, clear of aperture 33.

Connecting rods 50 (FIGS. 3–6). are pivotally connected to mirrors 20 and wheels 48, and translate the rotary motion of wheels 48 to a lateral, sliding motion of mirrors 20.

Pylons 54 (FIGS. 2, 2a and 3–6) are structures rigidly attached to camera body 14, and hold support wheels 44, gears 42, and wheels 48, which are pivotally connected to the pylons, and drive system 66, which is rigidly attached to the right-hand pylon, in the correct relationship.

Figure 10:
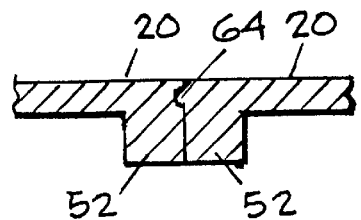
FIG. 10 is an enlarged detail of meeting edges of the mirrors.
Figure 8:
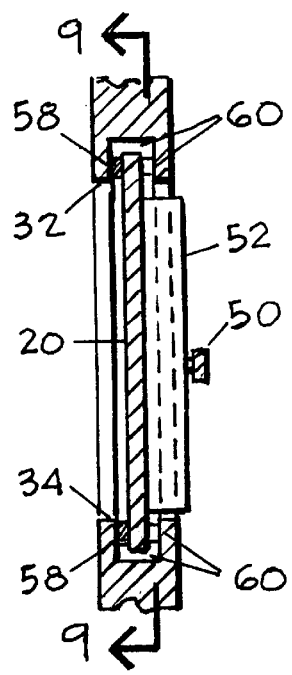
FIG. 8 is an enlarged sectional view of a mirror and its guidance system.
Figure 9:
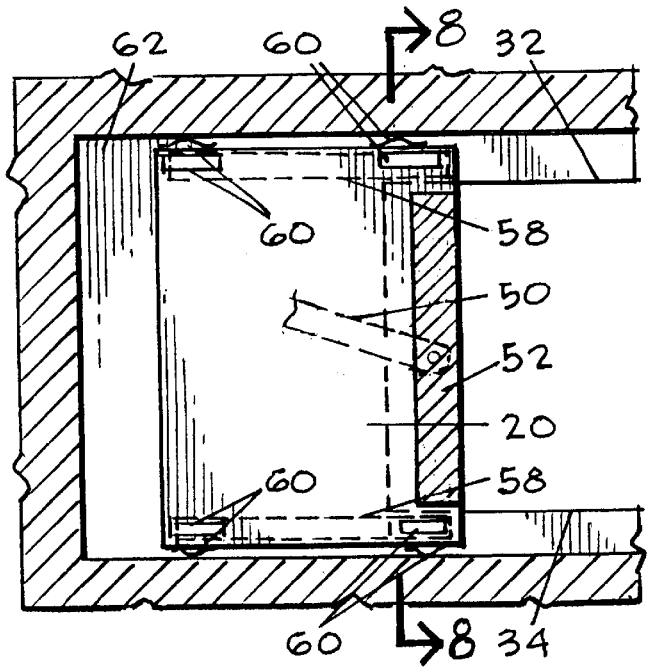
FIG. 9 is a view of mirror and housing taken along line 9—9 of FIG. 8.

Mirrors 20 (FIGS. 8–9) are sized to provide a light seal within guides 32 and 34. Resilient spacers 60 are attached to mirrors 20 to assure that, because of their spring action, the mirrors are in planar alignment when adjacent and stationary, and do not bind on guides 32 and 34 or housings 62 when moving. When in the adjacent and stationary position they reflect an undistorted image to viewing screen 22. A projecting sliding strip 58 is provided at the tops and bottoms of mirrors 20, (FIG. 8) to assure that mirrors 20 will not be scratched or damaged while sliding. The meeting edges of mirrors 20 have flanges 52 (FIG. 10), which reinforce the meeting edges and provide operating clearance for connecting rods 50, to which they are pivotally connected. Flanges 52 also include a light seal 64 (FIG. 10). Because the mirrors only reflect divergent rays of the image to be focused upon viewing screen 22, the line of their meeting edges will not appear on the screen.

Figure 5:
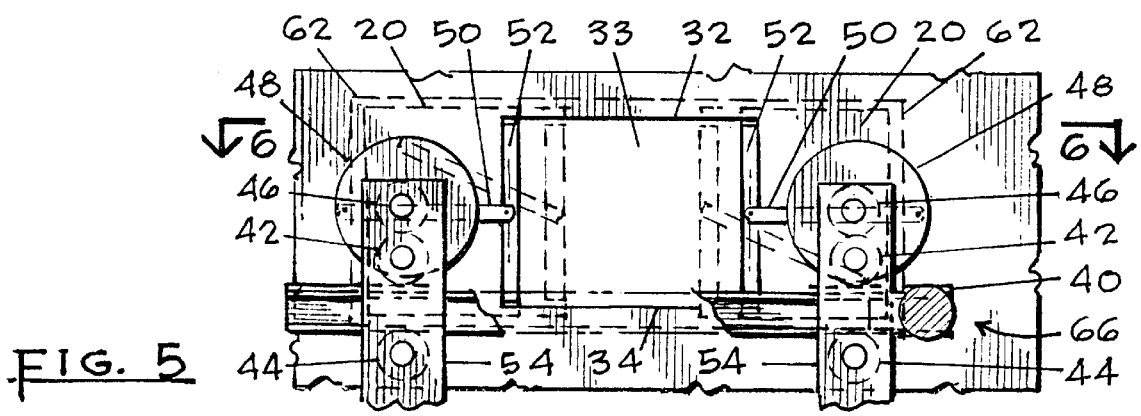
FIG. 5 is an elevation similar to FIG. 3, with mirrors in open position. Mirrors in an intermediate position are shown by dashed lines.

Aperture 33 is formed by top and bottom guides 32 and 34 and the inboard edges of housings 62 (FIG. 5).

Housings 62 (FIGS. 1, 6, and 8–9) are enclosures which receive and protect mirrors 20 when the mirrors are in their retracted (open) position.

Drive system 66 (FIGS. 11–16) initiates and controls the lateral motion of bar 40, and is comprised of two parts. A first part (FIGS. 11–12) includes pinion gear 70, a shaft 72, a driving spring 80, a winding gear 84, a compression spring 86, and a spring retainer cap 88. A spring housing 82 is rigidly attached to the right-hand pylon 54 by a mounting bracket 92. (FIG. 16). The assembly of gear 70, shaft 72, and spring retainer cap 88 is urged by spring 80 to rotate clockwise. It also slides laterally to enable gear 70 to engage alternately racks 76 or 78 of bar 40, as positioned by a cam 90 (described below), in conjuction with compression spring 86.

When shifting between racks 76 and 78, gear 70 momentarily meshes with both racks, thereby locking bar 40 and preventing gear 70 from rotating. The edges of racks 76 and 78, and gear 70 are beveled so as to mesh smoothly during the changeover.

A second part of system 66 (FIGS. 14–15) includes an escapement wheel 98 and a pawl 68 (FIG. 13), cam 90, a camshaft 96, a spring 102, and a spring winding gear 100. A spring housing 104 is rigidly mounted on camera body 14. The assembly of wheel 98, camshaft 96, and cam 90 rotates counterclockwise to position gear 70 laterally so as to engage racks on bar 40 alternately as described above (FIGS. 11–12).

Escapement wheel 98 (FIG. 13) is in the shape of two half-circles, offset so as to create two flat faces on the rim, separated by 180°. When pawl 68 is lifted, wheel 98 is allowed to rotate 180°, at which point the pawl, spring-loaded to ride against the wheel, drops into the next notch and the rotation is arrested.

Cam 90 is in the shape of an ellipse with an eccentric shaft so located that in a first position it causes pinion gear 70 to engage lower rack 76 of bar 40 (FIG. 12) and in a second position it causes gear 70 to engage upper rack 78 (FIG. 11).

Spring housings 82 and 104 include low-friction shaft bearings to assure proper alignment of the shafts.

Operation of mirror moving apparatus 30 (FIGS. 3–16)

To start the mirror moving sequence, pawl 68 (FIG. 13) momentarily lifts from one notch of escapement wheel 98 to allow the wheel, urged by spring 102, (FIGS. 14 and 15) to rotate counterclockwise. It then follows the wheel and drops to engage the approaching opposite notch to prevent further rotation. This rotates the assembly of escapement wheel 98, camshaft 96, and cam 90 180°. In this first position (FIG. 12), cam 90, by rotating against spring retainer cap 88, (now a cam follower), urges gear 70 to engage lower rack 76 of bar 40.

Figure 6:
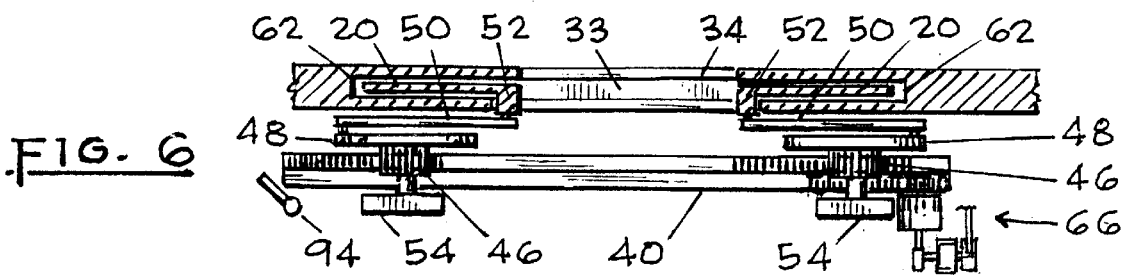
FIG. 6 is a horizontal section through the apparatus of FIG. 5, taken in the direction indicated by line 6—6 in FIG. 5.

Pinion gear 70 is urged by spring 80 to rotate clockwise. Now engaged with lower rack 76 of bar 40, it moves the bar to the left (FIG. 7). As bar 40 moves to the left, gears 42, rotating clockwise, translate this lateral motion into a counterclockwise rotation of wheels 48 through geared bosses 46. Through connecting rods 50, which connect wheels 48 to mirrors 20, the mirrors separate and retract into housings 62 (FIGS. 5–6)

Figure 3:
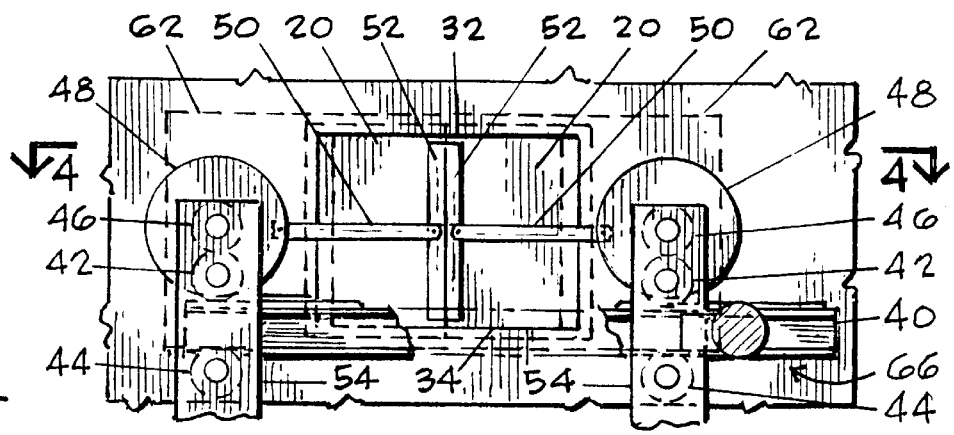
FIG. 3 is an elevation of the mirror moving apparatus of the camera, taken along line 3—3 of FIG. 2, with mirrors in closed position.
Figure 4:
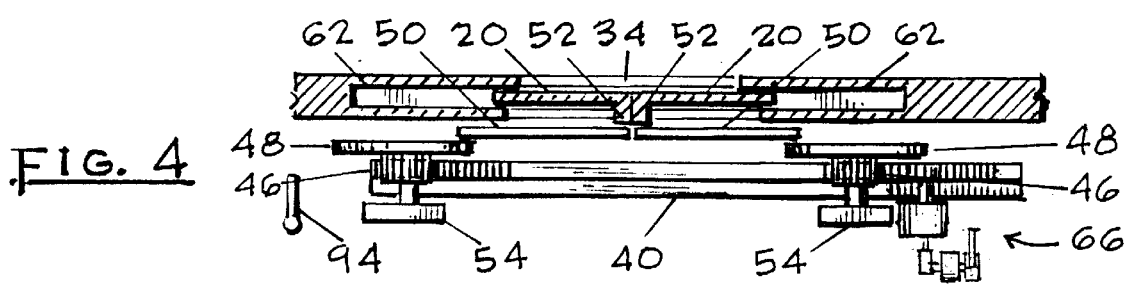
FIG. 4 is a horizontal section through the apparatus of FIG. 3, taken in the direction indicated by line 4—4 in FIG. 3.

Shutter 36 then opens and thereafter closes to expose film 38. After this the mirror movements are reversed. Pawl 68 again lifts and drops to permit the assembly of escapement wheel 98, camshaft 96, and cam 90 to rotate counterclockwise 180°. From this first position (FIG. 12), the rotation of cam 90 allows gear 70 to disengage from lower rack 76 and to engage upper rack 78 of bar 40 (FIG. 11). Gear 70, always rotating clockwise, then moves the bar to the right. As bar 40 moves to the right, gears 42 rotate counterclockwise to translate this lateral motion into a clockwise rotation of wheels 48 through geared bosses 46. Through connecting rods 50, the mirrors are then drawn from housings 62 and returned to their original adjacent position (FIGS. 3–4).

Driving spring 80 has a residual tension to keep pinion gear 70 acting on upper rack 78 (FIG. 11). Gear 70 urges rack 78 to the right to maintain the position of bar 40 in a mirrors closed position (FIG. 3) at all times that mirrors 20 are not open.

As wheels 48 rotate (FIGS. 3–6), the velocity of mirrors 20 follows a sinuous curve, gradually starting from zero when they are at their adjacent (closed) position, to a maximum when partialy separated, and back to zero at their fully separated (open) position. As mirrors 20 return to their adjacent position, this process reverses. Because of this gradual starting and stopping, there will be no sudden impacts or noise caused by the movement of mirrors 20. Since mirrors 20 move in opposite directions, their inertial forces cancel each other, resulting in substantially noiseless and vibration-free operation.

Description and operation of spring winding gears 84 and 100 (FIG. 16).

Winding gear 84 engages gear 108 (a part of a film advancing mechanism, not shown). As gear 108 rotates, gear 84, through shaft 72, creates tension in driving spring 80. Through this energy, spring 80 rotates pinion gear 70 to drive bar 40. A pawl 106 is located on winding gear 84 to prevent the gear from rotating in a counter-winding direction. In a similar manner, winding gear 100 (FIGS. 14–15) tensions spring 102 to rotate the assembly of escapement wheel 98, camshaft 96, and cam 90.

Detailed Operation—FIGS. 1–16

The above descriptions cover the component systems and their operation. The overall operation of the entire camera will now be covered.

By a known mechanism (not shown), generally by rotating a lever or knob, film 38 (FIGS. 1 and 2) is advanced to present an unexposed segment of film properly aligned to receive an image from lens 18. This film advancing action, through well known systems of gear trains and other linkages (not shown), is also used to create tension in driving spring 80 (FIGS. 11, 12 and 16) and cam spring 102 (FIGS. 13 and 14). Springs for other camera functions, such as shutter operation, eyepiece cap operation, stopping of a diaphragm to a pre-set position, a self timing operation, etc., are also tensioned by this action.

As shown in FIG. 2, an image travels along path 16 through lens 18 and is reflected upward to viewing screen 22 for focusing and composing the image. The image, now inverted, passes through field lens 24 and pentaprism 26, which erects and redirects the inverted image, and the user views the image through eyepiece 28. The user positions the camera to align the image as desired in the viewfinder.

When the user is satisfied with the image, the user presses a conventional shutter release button (not shown). This action, (through a mechanism not shown), lifts pawl 68 (FIG. 13) from the upper notch on escapement wheel 98 and then immediately releases it so that it rides against the wheel. The assembly of wheel 98, camshaft 96, and cam 90, freed from the restraint of pawl 68, and urged by spring 102, then rotates in a counterclockwise direction. After 180° of rotation its movement is arrested by pawl 68 engaging a second notch on escapement wheel 98.

This 180° rotation of cam 90 causes pinion gear 70 to disengage from upper rack 78 on bar 40 (FIG. 11), and urged by compression spring 86, to engage lower rack 76 (FIG. 12). As can best be seen in FIG. 7, gear 70, rotating in a clockwise direction, then drives bar 40 to the left.

As shown in FIGS. 3–6, and in more detail in FIG. 7, as bar 40 moves to the left, gears 42, meshed with rack 74, rotate clockwise. Since gears 42 also engage geared bosses 46 on wheels 48, the wheels then rotate in a counterclockwise direction. Because of this, connecting rods 50, which are pivotally connected to wheels 48 and flanges 52 on mirrors 20, cause the mirrors to separate and slide within guides 32 and 34 until they are moved fully into housings 62. This leaves an unobstructed passage through aperture 33 for the image to fall upon shutter 36 (FIG. 2).

Mirrors 20 are dynamically balanced. As stated, their velocity is controlled by wheels 48 (FIG. 5), so that they move smoothly from a zero velocity to a maximum and then back to zero. This virtually eliminates any noise or vibration from the mirror movement.

As bar 40 nears its most leftward position (FIG. 6), with mirrors 20 in their open positions, it strikes and deflects shutter lever 94. By known means (not shown), this causes shutter 36 to open and then close for a pre-set time to allow the image to be recorded on film 38 (FIG. 2). As shutter 36 closes, a further known mechanism (not shown) is activated to causes pawl 68 (FIG. 13) to be lifted again from the upper notch on escapement wheel 98. The assembly of wheel 98, camshaft 96, and cam 90, now freed from the restraint of pawl 68, and urged by spring 102, rotates counterclockwise another 180°. After this the movement is again arrested by pawl 68 engaging with the second notch on escapement wheel 98.

Cam 90, in this new position (FIG. 11), has urged pinion gear 70 to disengage from lower rack 76 on bar 40 and to engage upper rack 78. Gear 70, always rotating clockwise, now moves bar 40 to the right, causing wheels 48 to rotate clockwise. Mirrors 20, pivotally connected to wheels 48 through connecting rods 50 (FIG. 5), now move smoothly from housings 62 back to their original (mirrors closed) position (FIG. 3).

A known mechanism (not shown) causes eyepiece cap 56, (FIG. 2), to be closed when mirrors 20 are open. This prevents ambient light from entering the camera through the eyepiece and deleteriously affecting film 38 as a photographic exposure is made.

Thus, when the user depresses the shutter button, mirrors 20 move swiftly, smoothly and noiselessly out of the way of the image so it can then pass through aperture 33 (FIGS. 56) and fall upon shutter 36 and film 38 (FIG. 2). The lack of vibration and shock will result in a higher resolution image being recorded on the film. The return of mirrors, 20 to their closed and reflecting positions (FIGS. 1 and 3) is accomplished similarly with virtually no noise or vibration.

CONCLUSION

As will be understood from the above discussions and drawings, my camera mirror system has numerous advantages over today's typical single-lens-reflex systems, namely, 1) Its simplicity makes it less costly and easier to manufacture.
2) Most prior-art features of today's single-lens-reflex cameras, such as shutters, interchangeable and zoom lenses, built-in exposure meters, flash, exposure control devices and the like can be incorporated with little or no modification into a camera using my system.
3) Its noiseless performance will make it especially suitable for wildlife and candid photography.
4). It is adaptable to any size camera.
5). Its simple and rugged design makes it especially valuable for situations where a camera is subject to hard treatment.
6). The light weight and dynamic balance of the mirrors will allow faster mirror action with virtually no noise or vibration.
7) It can be used with any type of image recording medium.

RAMIFICATIONS

While the above description contains many specificities, these should not be considered limiting, but rather exemplary. Many ramifications are possible.

For example, the apparatus can be used in the type of camera in which the reflected image is viewed directly on the viewing screen The reflected image may be electronically recorded and viewed remotely. The apparatus can be used with any type of SLR camera using any type of recording medium, including 35 mm and larger and smaller film sizes, and digital cameras. Many different types of shutters can be employed, and methods other than a shutter release mechanism can be used to operate the camera. Many methods can be used to synchronize the various camera functions with my mirror moving system. A counterbalancing device can be introduced to eliminate any camera movement caused by lateral movement of bar 40. Wheels 48 can be in the form of a lever. While mirrors 20 and aperture 33 are shown as rectangular, they can also form a trapezoid to more closely approximate the pattern of the image falling upon the oblique surface of apparatus 30.

The above descriptions show a 35 mm single-lens-reflex camera using film, However, this method of moving the mirror out of the image path is particularly suitable for medium and large format single-lens-reflex cameras with their larger and heavier mirrors. It is also suitable for miniature cameras, where the compactness of this mirror moving system is advantageous, and for cameras using digitalized computer processing techniques rather than film.

Although what is shown is an apparatus mechanically driven by known means, such as springs tensioned by a film advancing operation, many other known techniques, such as electronically controlled electric circuits and motors, pneumatic devices, etc., can be employed to open and close the mirrors and operate the other camera functions with the same results.

SCOPE

Therefore, the scope of the invention should be determined by the following claims and their legal equivalents, rather than by the examples given.

What is claimed is:

1. An apparatus within the body of a single-lens-reflex camera for reflecting an image from an objective lens of said camera onto a viewing screen while said apparatus is in a closed position and for allowing said image to fall upon a light-sensitive surface at the rear of said camera while said apparatus is in an open position, comprising:
   (a) a plurality of mirrors slidably mounted on a plurality of fixed guides, and
   (b) mirror-moving means for slidably moving said mirrors along said fixed guides from said closed position, where said mirrors are adjacent to each other so as to reflect light of said image onto said viewing screen, to said open position, where said mirrors are separated from each other so as to allow light of said image to fall upon said light-sensitive surface, and then returning said mirrors to said closed position.

2. The apparatus of claim 1 wherein said mirror-moving means is arranged to cause said mirrors to be adjacent and coplanar in said closed position, so as to reflect said image in an undistorted manner to said viewing screen, and to separate said mirrors to provide an aperture through which said image can pass to the rear of said camera when said mirrors are in said open position, allowing said image to fall upon said light-sensitive surface.

3. The apparatus of claim 1 wherein said mirror-moving means comprises a plurality of members and a plurality of rotatable wheels, said plurality of members being pivotally connected between said mirrors and said plurality of rotatable wheels, said wheels being positionally located to urge said members to slide said mirrors along said guides when said wheels are rotated, so that the velocity of said mirrors will gradually increase when opening from said closed position, and will diminish and cease when said open position is reached, and so that a reversal of said velocity of said mirrors occurs as said mirrors go to their said closed position.

4. The apparatus of claim 3 wherein said mirror-moving means further includes a plurality of geared bosses projecting from said wheels, and a plurality of gears meshed with said bosses, such that said bosses are meshed with said gears in order to impart rotary motion to said wheels.

5. The apparatus of claim 1, further including a first light seal at the junction of said mirrors and said fixed guides, and a second light seal at the adjacent edges of said mirrors for when said mirrors are in said closed position.

6. The apparatus of claim 1, further including means for synchronizing the motion of said mirrors with at least one other camera function selected from the class consisting of film advancing mechanisms, camera activating mechanisms, shutter control devices, exposure control devices, and viewfinder eyepiece cap mechanisms.

7. The apparatus of claim 1 wherein said mirror-moving means is arranged to cause said mirrors to move in opposite directions and with equal velocity when moving to said open position or back to said closed position.

8. The apparatus of claim 1 wherein said mirrors include means to retain said mirrors in a single plane when said mirrors are contiguous in said guides.

9. A single-lens-reflex camera having a body with a front and a rear, comprising:
   (a) a lens at said front of said body,
   (b) a light-sensitive surface at said rear of said body for recording an image from said lens,
   (c) a shutter device to protect said light-sensitive surface from unwanted exposure to said image,
   (d) a viewing screen,
   (e) a pair of slidable mirrors, and
   (f) an apparatus mounted in said body between said lens and said light-sensitive surface, said apparatus being arranged to guide said slidable mirrors from a first position, in which said mirrors are adjacent and coplanar to reflect said image to said viewing screen, to a second position, in which said mirrors separate to allow said image to fall upon said shutter and said light-sensitive surface.

10. The apparatus of claim 9 wherein said apparatus for slidably moving said mirrors comprises a plurality of members arranged to cause the velocity of said mirrors gradually to increase when opening from said closed position and to gradually diminish and cease when said open position is reached, and to cause a reversal of this process when said mirrors go to said closed position.

11. The apparatus of claim 9, further including a shutter release button for initiating the sliding motion of said mirrors, said button being connected to an escapement wheel and pawl mechanism to cause said mirrors to open to said second position and then sequentially to cause said mirrors to close to said first position, said pawl and escapement mechanism being synchronized with at least one other camera function selected from the class consisting of film advancing mechanisms, camera activating mechanisms, shutter control mechanisms, exposure control mechanisms, and viewfinder eyepiece cap mechanisms.

12. The apparatus of claim 9, further including a first light seal at the junction of said mirrors and said fixed guides and a second light seal at the adjacent edges of said mirrors for when said mirrors are in said closed position.

13. A method for viewing an image prior to recording, and then recording said image in a single-lens-reflex camera having a body, an objective lens, a viewing screen, a shutter, a shutter control device, a film strip, and a camera activating mechanism, said method comprising:
   a) providing a pair of of bi-parting mirrors slidably mounted on fixed guides between said lens and said film strip, and
   b) moving said mirrors from a first position, in which said mirrors are adjacent and coplanar so as to reflect said image to said viewing screen, to a second position wherein said mirrors are slid apart to allow said image to fall upon said shutter and said film strip, and then returning said mirrors to said first position.

14. The method of claim 13, further including means for causing said mirrors to slide to said open position or to said closed position, so that the velocity of said mirrors will gradually increase from the start of said sliding until maximum velocity is reached, then gradually slow and cease as the end of said sliding is reached.

15. The method of claim 13, further including means for synchronizing the motion of said mirrors as said mirrors go to a first position, in which said mirrors are contiguous and coplanar, to a second position, in which said mirrors are separated, with at least one other camera function, selected from the class consisting of film advancing mechanisms, camera activating mechanisms, shutter control devices, and exposure control devices.

16. The method of claim 13, further including a first light seal at the junction of said mirrors and said fixed guides and a second light seal at the adjacent edges of said mirrors for when said mirrors are in said closed position.

17. The method of claim 16, further including resilient clips on the back face of said mirrors to cause said mirrors to bear against said fixed guides.

* * * * *